United States Patent Office 3,557,259
Patented Jan. 19, 1971

3,557,259
MONO-OMEGA-ALKYNYL DI(ARYL- OR ARALKYL) PHOSPHINATES
Ronald Eugene Montgomery, Middleport, and Harry Hobart Incho, Medina, N.Y., assignors to FMC Corporation, New York, N.Y., a corporation of Delaware
No Drawing. Continuation-in-part of applications Ser. No. 540,175, Apr. 5, 1966; Ser. No. 559,412 and Ser. No. 559,422, both of June 22, 1966; Ser. No. 559,745, June 23, 1966; Ser. No. 624,689, Mar. 21, 1967; and Ser. No. 630,204, Apr. 12, 1967. This application Apr. 27, 1967, Ser. No. 634,121
Int. Cl. A01n 9/36; C07f 9/30
U.S. Cl. 260—956  11 Claims

ABSTRACT OF THE DISCLOSURE

Synergistic insecticidal combinations of esters of chrysanthemumic acid, e.g. pyrethrins, allethrin, and related compounds, with mono-ω-alkynyl di(aryl- or aralkyl) phosphinates are described. The preparation and properties of representative members of this new of synergistic phosphinates are described, and test results of their synergistic combinations with representative chrysanthemumates are reported.

CROSS REFERENCE TO RELATED APPLICATIONS

This application is a continuation-in-part of Ser. No. 559,412, filed June 22, 1966, now abandoned, and is related to copending applications Ser. No. 540,175, filed Apr. 5, 1966 now abandoned, Ser. No. 559,422, filed June 22, 1966 now abandoned, Ser. No. 559,745, filed June 23, 1966, and Ser. No. 624,689 filed Mar. 21, 1967 now abandoned, and Ser. No. 630,204 filed Apr. 12, 1967.

BACKGROUND OF THE INVENTION

Among the most widely used insecticides today are the pyrethrins, the active principle of pyrethrum flowers (*Chrysanthemum cinerariaefolium*), which have a high order of insecticidal activity and a low mammalian toxicity. The relatively high cost and the uncertain supply of pyrethrins have encouraged attempts to prepare synthetic insecticides which retain the desirable properties of pyrethrins. It has long been known that synthetic products having a basic structural similarity to pyrethrins in that they are esters of 2,2-dimethyl-3-(2-methylpropenyl) cyclopropanecarboxylic acid (which is also known as chrysanthemumic acid and will be so referred to herein) exhibit insecticidal activity of a significant order.

The wide market which pyrethrins and related synthetic insecticides enjoy today is primarily due to the discovery of certain additives which enhance the activity of these insecticides. These additives, commonly called synergists, are agents which may or may not themselves exhibit insecticidal activity, but which when combined with pyrethrins or related compounds produce new insecticidal compositions, having an effectiveness significantly greater than the sum of the effectiveness of the components when used separately. A great deal of time and effort has been devoted to the search for effective synergists. One of the most effective and most widely used of the pyrethrins synergists is the compound piperonyl butoxide, which is described in synergistic combination with pyrethrins in Wachs U.S. Pat. 2,550,737. Unfortunately, it has been found that many compounds which are excellent synergists for pyrethrins are not nearly as effective when used with allethrin or other synthetic cyclopropanecarboxylic acid esters.

SUMMARY OF THE INVENTION

This invention relates to novel compositions for the control of insects and acarids and in particular to such pesticidal compositions containing pyrethrins, allethrin, or related insecticidal cyclopropanecarboxylic acid esters, in combination with certain mono-ω-alkynyl di(aryl- or aralkyl)phosphinates as synergists for insecticidal activity.

DESCRIPTION OF THE PREFERRED EMBODIMENT

The synergistic phosphinates of this class have the structural formula:

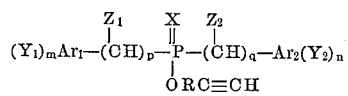

wherein R is an alkylene group of one to six carbon atoms, straight or branched chain; $Ar_1$ and $Ar_2$ are each aromatic radicals such as phenyl, pyridyl, thienyl, pyrryl, furyl, isothiazolyl, and the corresponding benzo-derivatives such as naphthyl, thionaphthyl or benzofuryl; X may be oxygen or sulfur; $Y_1$ and $Y_2$ represent substituents such as halogen or cyano; $Z_1$ and $Z_2$ are each hydrogen, or substituents such as methyl or chlorine; $m$ and $n$ are each an integer from 0 to 2 inclusive; and $p$ and $q$ are each an integer from 0 to 1 inclusive.

Particularly useful are those compounds of the formula:

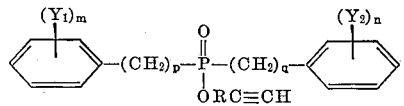

wherein R is an alkylene group of one to four carbon atoms; $Y_1$ and $Y_2$ are each either chlorine or cyano; $m$ and $n$ are each an integer of 0 to 2 inclusive; and $p$ and $q$ are each an integer of 0 to 1 inclusive.

Of the natural and synthetic esters of cyclopropanecarboxylic acids the best known members, preferred for use herein because of their general insecticidal activity and availability, are the esters of chrysanthemumic acid, which have the general structure:

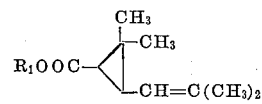

and wherein the radical $R_1$ can be any of the very large number of radicals which have been found to form insecticidal chrysanthemumates. For example, this class of esters includes the pyrethrins, allethrin (3-allyl-2-methyl-4-oxo-2-cyclopentenyl chrysanthemumate) and related insecticides as described by Schechter and La Forge in U.S. Pat. 2,661,374; cyclethrin (3-(2-cyclopentenyl)-2-methyl-4-oxo-2-cyclopentenyl chrysanthemumate) as described by Guest and Stansbury in U.S. Pat. 2,891,888; furethrin (3 - furfuryl - 2 - methyl - 4-oxo-2-cyclopentenyl chrysanthemumate) as described in National Distillers Products, British Pat. 678,230; barthrin (6-chloropiperonyl chrysanthemumate) and its bromo analog, as described by Barthel et al. in U.S. Pat. 2,886,485; dimethrin (2,4-dimethylbenzyl chrysanthemumate) and the 3,4-dimethyl isomer, as described by Barthel in U.S. Pat. 2,857,309; compounds of the classes of (cyclohexene-1,2-dicarboximido)methyl chrysanthemumates as described in Belgian Pat. 646,399 and (cyclohexadiene-1,2-dicarboximido)methyl chrysanthemumates as described in Belgian Pat. 651,737, both to the Sumitomo Chemical Company, Ltd.; and related compounds such as phthalimidoalkyl and substituted phthalimidoalkyl chrysanthemumates as described in Sumitomo Belgian Pat. 635,902. Other insecticidal esters of chrysanthemumic acid also form synergistic combinations with the phosphinates of this invention.

The preparation of phosphinates of this invention and their synergistic insecticidal properties are illustrated in the following examples, which are not intended to be limitative of the variety of procedures which are applicable to the synthesis of mono-$\omega$-alkynyl phosphinates, or of the many insecticidal combinations in which they are effective. In these examples, all temperatures are in degrees centigrade.

EXAMPLE 1

Preparation of 3-butynyl (4-chlorobenzyl) phenylphosphinate (1A) Ethyl (4-chlorobenzyl)phenylphosphinate.—Under a nitrogen atmosphere, 29.8 g. diethyl phenylphosphite and 27.4 g. 4-chlorobenzyl chloride were reacted at 120–130° with continuous distillation of the resulting ethyl chloride. Upon cooling, the product, ethyl (4-chlorobenzyl)phenylphosphinate, solidified. This material, washed with pentane and dried in a vacuum desiccator, melted at 73–74°.

(1B) (4 - chlorobenzyl)phenylphosphinic acid.—Into 100 ml. of 6 N hydrochloric acid and 50 ml. dioxane was dissolved 33 g. ethyl (4-chlorobenzyl)phenylphosphinate and the mixture was heated on a steam bath overnight. The resulting solid, (4-chlorobenzyl)phenylphosphinic acid, was washed with ether, dried, and recrystallized from ethanol; M.P. 201–203° C.

(1C) (4-chlorobenzyl)phenylphosphinic chloride.—To 24 g. (4-chlorobenzyl)phenylphosphinic acid was added with stirring 33.9 ml. thionyl chloride. The mixture was refluxed on a water bath for two hours and allowed to cool to room temperature and stand overnight. The solidified mixture was washed three times with 100 ml. portions of pentane to remove excess thionyl chloride. The washed product, (4-chlorobenzyl)phenylphosphinic chloride, melted at 146–150°.

(1D) 3-butynyl (4-chlorobenzyl)phenylphosphinate.— A mixture of 2.4 g. 3-butyn-1-ol and 3.4 g. triethylamine in 100 ml. tetrahydrofuran was placed in a flask in an ice-bath and the system was purged with nitrogen. A solution of 8.6 g. (4-chlorobenzyl)phenylphosphinic chloride in 50 ml. tetrahydrofuran was added slowly during 30 minutes. When addition was complete, the mixture was allowed to warm slowly to room temperature. Stirring was continued overnight. The mixture was then filtered, and the filtrate concentrated to give a yellow oil which solidified. The yellow solid was dissolved in 100 ml. benzene and the solution washed successively with 100 ml. dilute sodium hydroxide, 100 ml. dilute hydrochloric acid, and 100 ml. water. The washed solution was dried over magnesium sulfate, then treated with charcoal to reduce the color. The solution was then concentrated to about half its volume, and pentane added until oil separated. The pentane solution was decanted from the oil and reduced to half volume by evaporation of solvent. This solution was chilled, and a fluffy white solid was collected.

Additional product was collected from the oil, by dissolving the oil in hot pentane, filtering the hot solution to remove traces of insoluble material and concentrating the filtrate until white solid began to separate. Recrystallization from hexane of the combined product gave 1.6 g. of 3-butynyl (4-chlorobenzyl)phenylphosphinate, M.P. 70–73°.

Analysis.—Calc'd for $C_{17}H_{16}ClO_2P$ (percent): C, 64.06; H, 5.06; P, 9.72. Found (percent): C. 64.21; H, 5.31; P, 9.43.

Repeated crystallization of the product of a subsequent synthesis raised the melting point to 77–78°.

EXAMPLE 2

The synergistic activity of 3-butynyl (4-chlorobenzyl)phenylphosphinate

The synergistic insecticidal activity of 3-butylnyl (4-chlorobenzyl)phenylphosphinate in combination with allethrin was determined by the following procedure: The test compound and allethrin were dissolved in 70 parts of acetone, which was then made up to 100 parts by volume by addition of water. A group of 30 to 40 houseflies (*Musca domestica* L.), immobilized under carbon dioxide, was placed on a moist filter paper in a Buchner funnel attached to a vacuum source. Twenty-five ml. of test solution was poured over the immobilized flies, this being sufficient volume that all flies were completely immersed. Vacuum was then applied to remove the test solution, and the flies were transferred to holding cages lined with absorbent paper. Mortality counts were made after 24 hours. Results are shown in Table 1, for varying ratios and concentrations of synergist and allethrin. In this and subsequent tables, the amounts of the test ingredients are stated in concentration terms of mg. per 100 ml. of test solution.

TABLE 1.—COMPOSITIONS OF 3-BUTYNYL (4-CHLOROBENZYL)PHENYLPHOSPHINATE AND ALLETHRIN

| Synergist, mg. | Allethrin, mg. | Mortality of houseflies, percent |
|---|---|---|
| 500 | 5 | 100 |
| 50 | 10 | 100 |
| 50 | None | 0 |
| None | 10 | 34 |

EXAMPLE 3

The synergistic activity of 3-butynyl (4-chlorobenzyl)-phenylphosphinate with a wide variety of chrysanthremumate esters was evaluated against houseflies by the following procedure: About one microliter of a solution containing the indicated amount of the test materials in 100 ml. of acetone was applied topically to each of 35 to 45 three- to four-day-old houseflies (*Musca domestica*) in one to four replicates. After 24 hours the mortality was determined by physical counting of the dead and living flies, and the percent kill was calculated. Results are shown in Table 2.

TABLE 2.—COMPOSITIONS OF 3-BUTYNYL (4-CHLOROBENZYL)PHENYLPHOSPHINATE AND CHRYSANTHEMUMATES

| Chrysanthemumate | Milligrams | Synergist, mg. | Mortality of houseflies, percent |
|---|---|---|---|
| Cyclethrin | 14.4 | 72 | 90 |
| | None | 150 | 0 |
| | 24 | None | 9 |
| Allethrin | 14.4 | 72 | 99 |
| | None | 150 | 0 |
| | 24 | None | 11 |
| Pyrethrins | 14.4 | 72 | 91 |
| | None | 150 | 0 |
| | 42 | None | 9 |
| Dimethrin | 14.4 | 72 | 55 |
| | None | 150 | 0 |
| | 150 | None | 19 |
| (1-cyclohexene-1,2-dicarboximido)-methyl chrysanthemumate. | 14.4 | 72 | 99 |
| | None | 150 | 0 |
| | 20 | None | 20 |

The results shown in Table 2 demonstrate the general nature of the synergistic interaction between an ω-alkynyl phosphinate of this invention and chrysanthemumates. Even at dosages as high as 150 mg. this phosphinate itself was inactive, yet a consistent and substantial synergistic effect was observed when combined with chrysanthemumates which, even at relatively high concentrations, produced negligible kill of houseflies.

EXAMPLE 4

Preparation of 1-methyl-2-propynyl diphenylphosphinate

To a mixture of 4.6 g. 3-butyn-2-ol, 6.6 g. triethylamine, and 12.9 g. bromotrichloromethane in 100 ml. dry benzene, chilled in an ice bath, was added 12 g. diphenylphosphine oxide in 100 ml. dry benzene. The reaction vessel was protected from moisture with a tube containing desiccant and allowed to stand for two days. Triethylammonium bromide was filtered from the reaction mixture and washed with benzene. The filtrate, with the wash added, was washed successively with 50 ml. each of 1 N hydrochloric acid, 2% sodium hydroxide, and water. The organic phase was dried over $MgSO_4$, treated with activated charcoal, and concentrated. The resulting brown oil was distilled to yield 1-methyl-2-propynyl diphenylphosphinate (bath temperature, 142–190°; pressure 0.5μ Hg).

*Analysis.*—Cal'd for $C_{16}H_{15}O_2P$ (percent): C, 71.11; H, 5.59; P, 11.46. Found (percent): C, 71.16; H, 5.63; P, 11.60.

EXAMPLE 5

The synergistic activity of 1-methyl-2-propynyl diphenylphosphinate

The synergistic insecticidal activity of 1-methyl-2-propynyl diphenylphosphinate in combination with allethrin, pyrethrins, and (1-cyclohexene-1,2-dicarboximido)methyl chrysanthemumate was determined by the test procedure of Example 2. Results are shown in Table 3.

TABLE 3.—COMPOSITIONS OF 1-METHYL-2-PROPYNYL DIPHENYLPHOSPHINATE AND CHRYSANTHEMUMATES

| Chrysanthemumate | Milligrams | Synergist, mg. | Mortality of houseflies, percent |
| --- | --- | --- | --- |
| Allethrin | 10 | 50 | 100 |
|  | None | 50 | 0 |
|  | 10 | None | 18 |
| Pyrethrins | 10 | 50 | 100 |
|  | None | 50 | 0 |
|  | 10 | None | 10 |
| 1-(cyclohexene-1,2-dicarboximido)-methyl chrysanthemumate. | 10 | 50 | 100 |
|  | None | 50 | 0 |
|  | 10 | None | 24 |

Table 3 shows that 1-methyl-2-propynyl diphenylphosphinate, itself inactive at the dosage used, is an effective synergist for a variety of chrysanthemumates.

EXAMPLE 6

The synergistic activity of 1-methyl-2-propynyl diphenylphosphinate with two synthetic chrysanthemumate esters against houseflies was further demonstrated using the test procedure of Example 3. Results are shown in Table 4.

TABLE 4.—COMPOSITIONS OF 1-METHYL-2-PROPYNYL DIPHENYLPHOSPHINATE AND CHRYSANTHEMUMATES

| Chrysanthemumate | Milligrams | Synergist, mg. | Mortality of houseflies, percent |
| --- | --- | --- | --- |
| Allethrin | 14.4 | 72 | 63 |
|  | None | 72 | 0 |
|  | 14.4 | None | 16 |
| (1-cyclohexene-1,2-dicarboximido)-methyl chrysanthemumate. | 14.4 | 72 | 96 |
|  | None | 72 | 5 |
|  | 14.4 | None | 18 |

EXAMPLE 7

Preparation of 2-propynyl phenyl (2-thienyl) phosphinate (7A) Phenyl(2-thienyl)phosphine oxide.—To a stirred solution of 31.6 g. thiophene in 500 ml. anhydrous ether under a nitrogen atmosphere was added dropwise 24 g. of n-butyl lithium in about 230 ml. ether. During addition the solution refluxed, and refluxing was continued for one hour after addition was complete. The reaction mixture was cooled, and 33.3 g. of butyl phenylphosphinate in 100 ml. ether was added dropwise. The solution was refluxed during, and for one hour after, addition. To the mixture was added dropwise 100 ml. of 5% sulfuric acid. The resulting layers were treated separately. The ether layer was dried over $MgSO_4$, filtered and flash evaporated to give phenyl(2-thienyl)phosphine oxide. The aqueous layer and the ether-insoluble organic layer, which had formed, were extracted three times with 75 ml. of benzene. The extract was dried over $MgSO_4$ and flash evaporated to yield additional phenyl(2-thienyl)phosphine oxide. The product was used without further purification for the next synthesis.

(7B) 2-propynyl phenyl(2-thienyl)phosphinate.—Following the procedure described in Example 4, 2.4 g. 2-propyn-1-ol, in the presence of 3.4 g. bromotrichloromethane and 4.3 g. triethylamine, was reacted with 8.0 g. phenyl (2-thienyl)phosphine oxide. The finished product distilled at 153–161°/0.4μ Hg. Gas chromatography was used to check the purity of the product.

*Analysis.*—Calc'd for $C_{13}H_{11}O_2PS$ (percent): C, 59.54; H, 4.23; P, 11.81. Found (percent): C, 59.80; H, 4.25; P, 11.63.

EXAMPLE 8

Preparation of 3-butynyl diphenylphosphinate

Following the procedure described in Example 1, 3-butyn-1-ol and diphenylphosphinic chloride were reacted to form 3-butynyl diphenylphosphinate: melting point 87–89.5° C.

*Analysis.*—Calc'd for $C_{16}H_{15}O_2P$ (percent): C, 71.11; H, 5.59; P, 11.46. Found (percent): C, 70.94; H, 5.68; P, 11.42.

EXAMPLE 9

Preparation of 3-butynyl dibenzylphosphinate

Following the procedure described in Example 4, 3-butyn-1-ol and dibenzylphosphine oxide were reacted to form 3-butynyl dibenzylphosphinate, melting at 79–80° C.

*Analysis.*—Calc'd for $C_{18}H_{19}O_2P$ (percent): C, 72.47; H, 6.42. Found (percent): C, 72.32; H, 6.63.

EXAMPLE 10

Preparation of 3-butynyl (benzyl)phenylphosphinate (10A) (Benzyl)phenylphosphinic chloride.—Following the procedure described in Example 1C benzylphenylphosphinic acid was reacted with thionyl chloride to give (benzyl)phenylphosphinic chloride, M.P. 76–81°.

(10B) 3-butynyl (benzyl)phenylphosphinate.—Following the procedure described in Example 1, 3-butyn-1-ol and (benzyl)phenylphosphinic chloride were reacted to form 3-butynyl (benzyl)phenylphosphinate, identified by nuclear magnetic resonance.

*Analysis.*—Calc'd for $C_{17}H_{17}O_2P$ (percent): C, 71.82; H, 6.03; P, 10.90. Found (percent): C, 72.10; H, 6.21; P, 11.04.

EXAMPLE 11

Preparation of 3-butynyl (4-chlorophenyl)phenylphosphinate (11A) (4-chlorophenyl)phenylphosphinic chloride.—Following the procedure described in Example 1C, (4- chlorophenyl)phenylphosphinic acid and thionyl chloride were reacted to form the corresponding phosphinic chloride which distilled at 150–163°/0.05 mm. Hg.

(11B) 3-butynyl (4-chlorophenyl)phenylphosphinate.—Following the procedure described in Example 1, 3-butyn-1-ol and (4-chlorophenyl)phenylphosphinic chloride were reacted to form 3-butynyl (4-chlorophenyl) phenylphosphinate which melted at 100–101° C.

*Analysis.*—Calc'd for $C_{16}H_{14}O_2ClP$ (percent): C, 63.07; H, 4.63. Found (percent): C, 63.25; H, 4.72.

H, 5.15; P, 12.08. Found (percent): C, 70.08; H, 5.29; P, 11.86.

EXAMPLES 13 TO 31

Following the general procedure exemplified above, a large number of compounds of this class are readily synthesized. The synergistic activity of typical phosphinates of this invention, in combination with typical and useful chrysanthemumates, is further illustrated in Table 5. These results were obtained following the procedure described in Example 2.

TABLE 5.—SYNERGISTIC INSECTICIDAL COMPOSITIONS

| Chrysanthemumate | Milligrams | Phosphinate | Milligrams | Mortality of houseflies, percent |
|---|---|---|---|---|
| (1-cyclohexene-1,2-dicarboximido)methyl chrysanthemumate | 10 None 10 | 2-propynyl bis-(2-thienyl)phosphinate | 50 50 None | 100 0 24 |
| Pyrethrins | 10 None 10 | 2-propynyl (benzyl)phenylphosphinate | 50 50 None | 100 5 10 |
| Allethrin | 10 None 10 | 2-propynyl (2-chlorobenzyl)phenylphosphinate | 50 50 None | 100 0 18 |
| Do | 5 None 10 | 2-propynyl (4-chlorobenzyl)phenylphosphinate | 50 50 None | 78 0 18 |
| Pyrethrins | 5 None 10 | 2-propynyl diphenylphosphinate | 50 50 None | 100 3 10 |
| Do | 10 None 10 | 2-propynyl phenyl(2-thienyl)phosphinate | 50 50 None | 96 6 10 |
| Allethrin | 10 None 10 | 3-butynyl bis(2-thienyl)phosphinate | 50 50 None | 100 0 18 |
| Do | 10 None 10 | 3-butynyl (benzyl)phenylphosphinate | 50 50 None | 100 7 18 |
| Pyrethrins | 10 None 10 | 3-butynyl (2-chlorobenzyl)phenylphosphinate | 50 50 None | 100 3 10 |
| Allethrin | 10 None 10 | 3-butynyl (4-chlorophenyl)phenylphosphinate | 50 50 None | 100 0 18 |
| Do | 10 None 10 | 3-butynyl (4-cyanophenyl)phenylphosphinate | 50 50 None | 100 0 11 |
| Pyrethrins | 10 None 10 | 3-butynyl dibenzylphosphinate | 50 50 None | 97 0 10 |
| Do | 5 None 10 | 3-butynyl diphenylphosphinate | 50 50 None | 90 3 10 |
| (1-cyclohexene-1,2-dicarboximido)methyl chrysanthemumate | 10 None 10 | 3-butynyl phenyl(2-thienyl)phosphinate | 50 50 None | 100 2 24 |
| Do | 10 None 10 | 1-methyl-2-propynyl phenyl(2-thienyl)phosphinate | 50 50 None | 100 2 24 |
| Pyrethrins | 10 None 10 | 4-pentynyl(benzyl)phenylphosphinate | 50 50 None | 100 5 10 |
| Allethrin | 10 None 10 | 4-pentynyl (2-chlorobenzyl)phenylphosphinate | 50 50 None | 100 0 18 |
| Do | 10 None 10 | 4-pentynyl (4-chlorobenzyl)phenylphosphinate | 50 50 None | 100 0 18 |
| Pyrethrins | 10 None 10 | 4-pentynyl diphenylphosphinate | 50 50 None | 100 0 10 |

EXAMPLE 12

Preparation of 2-propynyl diphenylphosphinate

Following the procedure described in Example 1, 2-propyn-1-ol was reacted with diphenylphosphinic chloride. The product, distilling at 132–135°/0.1µ Hg, was identified by its infrared spectrum as 2-propynyl diphenylphosphinate.

*Analysis.*—Calc'd for $C_{15}H_{13}PO_2$ (percent): C, 70.28;

EXAMPLE 32

The synergistic activity of the phosphinates of this invention with chrysanthemumates over a wide range of chrysanthemumate to synergist ratios was determined by a series of tests carried out by the method described in Example 2. Results for two different chrysanthemumate-synergist combinations are shown in Table 6.

TABLE 6.—COMPOSITIONS WITH DIFFERENT CHRYSANTHEMUMATE TO SYNERGIST RATIOS

| Chrysan-themumate mg. (A) | Synergist mg.(B) | Ratio, A:B | Mortality of houseflies, Composition I | Mortality of houseflies, Composition II |
|---|---|---|---|---|
| 5 | None | | 9 | 13 |
| 5 | 10 | 1:2 | 90 | 72 |
| 5 | 25 | 1:5 | 100 | 89 |
| 5 | 50 | 1:10 | 100 | 100 |
| 5 | 100 | 1:20 | 100 | 100 |
| 5 | 250 | 1:50 | 100 | 100 |
| None | 100 | | 6 | 3 |
| None | 250 | | 14 | 28 |
| None | 500 | | 37 | 52 |

NOTE:
Composition I: Chrysanthemumate: 1-cyclohexene-1,2-dicarboximido)methyl chyrsanthemumate; Synergist: 3-butynyl (4-chlorobenzyl)-phenylphosphinate.
Composition II: Chrysanthemumate: allethrin; Synergist: 2-propynyl diphenylphosphinate.

The results in Table 6 illustrate the marked synergistic interaction found over a wide range of ratios.

EXAMPLE 33

The effectiveness of the synergistic compositions of this invention is strikingly shown in aerosol formulations. The following example demonstrates synergistic interaction at different chrysanthemumate to synergist ratios. Aerosol formulations were prepared without synergist and with different amounts of synergist as follows:

|   | Wt. percent |
|---|---|
| Trichloromonofluoromethane | 40.0 |
| Dichlorodifluoromethane | 40.0 |
| Trichloroethane | 10.0 |
| Chrysanthemumate | 0–0.25 |
| Synergist | 0–2.50 |
| Purified kerosene | Balance |

A group of 200 to 300 houseflies was introduced into a 216 cu. ft. test chamber, prepared according to the specifications of the Chemical Specialties Manufacturers Association (Soap and Chemical Specialties, 1961 Blue Book p. 244). Measured amounts of the aerosol formulations were introduced into the chamber. Results, shown in Table 7, are the averages of two replicates for the compostions containing the synergist alone and of six replicates for all other compositions.

TABLE 7.—AEROSOL FORMULATIONS WITH DIFFERENT CHRYSANTHEMUMATE TO SYNERGIST RATIOS

Chrisanthemumate: (1 - cyclohexene-1,2-dicarboximido) methyl chrysanthemumate
Synergist: 2-propyl diphenylphosphinate

| Percent chrysan-themumate (A) | Percent syner-gist (B) | Ratio, A:B | Average dose, g./1,000 c.f. | Knock down 15 minutes percent | Mortality 24 hours, percent |
|---|---|---|---|---|---|
| 0.25 | None | | 3.02 | 87 | 34 |
| 0.25 | 0.25 | 1:1 | 3.04 | 93 | 68 |
| 0.25 | 0.75 | 1:3 | 3.21 | 92 | 88 |
| 0.25 | 1.25 | 1:5 | 3.07 | 91 | 90 |
| 0.25 | 1 2.50 | 1:10 | 3.05 | 1 90 | 1 95 |
| Name | 1 2.50 | | 2.89 | 1 0 | 1 14 |

1 Contained no purified kerosene, balance in formulaion is 1,1,1-trichloroethane.

This table shows that the chrysanthemumate alone has good knockdown, but poor kill, while the synergist has no knockdown effectiveness and very poor kill. The combination of this invention shows both good knockdown and good kill over a range of ratios.

EXAMPLE 34

The effectiveness of aerosol formulations containing a variety of different phosphinate synergists of this invention is shown in the following example. Aerosol formulations were prepared as follows:

|   | Wt. percent |
|---|---|
| Trichloromonofluoromethane | 40.0 |
| Dichlorodifluoromethane | 40.0 |
| Methylenechloride | 10.0 |
| Purified kerosene | 8.5 |
| (1-cyclohexene - 1,2 - dicarboximido)-methyl chrysanthemumate | 0.25 |
| Synergist | 1.25 |

The formulations were tested against houseflies according to the test procedure described in Example 33. The results in Table 8 are averages of ten to sixteen replicates.

TABLE 8.—AEROSOL FORMULATIONS WITH DIFFERENT SYNERGISTS

[Chyrsanthemumate: (1-cyclohexene-1,2-dicarboximido) methyl chrysanthemumate]

| Synergist | Average dose, g./1,000 c.f. | Knockdown 15 minutes, percent | Mortality 24 hours, percent |
|---|---|---|---|
| 2-propynyl (benzyl)-phenyl phosphinate | 2.96 | 86 | 62 |
| 2-propynyl (2-chlorobenzyl) phenylphosphinate | 3.15 | 89 | 66 |
| 2-propynyl diphenylphosphinate | 3.10 | 94 | 90 |
| 3-butynyl (2-chlorobenzyl) phenylphosphinate | 3.05 | 90 | 74 |
| 3-butynyl (4-chlorobenzyl) phenylphosphinate | 3.12 | 91 | 87 |
| None 1 | 3.02 | 87 | 34 |

1 In the formulation of Example 33, i.e., different solvent.

Thus a variety of synergists give a substantial improvement in kill.

EXAMPLE 35

Synergistic activity of the phosphinate synergists of this invention against the German cockroach (*Blatella germanica*) was tested by the following procedure: Adult male roaches were completely immersed for about 5 seconds in test solutions consisting of 3-butynyl (4-chlorobenzyl)phenylphosphinate and the indicated chrysanthemumate ester in 50% aqueous acetone. The roaches were then transferred to holding cages, and the mortality was determined after 24 hours. Five replicates of 19 or 20 roaches each were run at each concentration, which is given in the table as mg. per 100 ml. solution. The results shown in Table 9 represent the average of each set of 5 replicates.

TABLE 9.—COMPOSITIONS OF 3-BUTYNYL (4-CHLOROBENZYL) PHENYLPHOSPHINATE AND CHRYSANTHEMUMATES

| Chrysanthemumate | Milligrams | Synergist, milligrams | Mortality of roaches, percent |
|---|---|---|---|
| Allethrin | 10 | 100 | 010 |
|   | None | 100 | 0 |
|   | 10 | 50 | 99 |
|   | 10 | 10 | 74 |
|   | None | 10 | 0 |
|   | 10 | None | 4 |
| (1-cyclohexene-1,2-dicarboximido) methylchrysanthemumate | 10 | 100 | 96 |
|   | None | 100 | 0 |
|   | 10 | 50 | 68 |
|   | 10 | 10 | 10 |
|   | None | 10 | 0 |
|   | 10 | None | 0 |

In addition to the specific phosphinates exemplified herein, similar synergistic behavior characterizes the other members of the class described, including but not limited to the following:

5-hexynyl (4-chlorobenzyl) (4-cyanobenzyl)phosphinate;
4-pentynyl diphenylphosphinothionate;
7-octynyl (2,4,α-trichlorobenzyl) (4-chlorophenyl)phosphinate;
1-methyl-2-propynyl (benzyl)phenylphosphinothionate;
1-methyl-3-butynyl (3-chlorobenzyl) (2,4-dichlorophenyl)phosphinate;
3-butynyl (4-bromobenzyl) (thienyl)phosphinate;

1,1-dimethyl-3-butynyl (benzyl)(4-cyanophenyl)phenylphosphinate;
3-butynyl (1-phenylethyl)phenylphosphinate;
2-ethyl-3-butynyl bis(α-chlorobenzyl)phosphinate;
3-butynyl (4-iodobenzyl benzyl) phosphinate;
3-methyl-4-pentynyl (2,3-dichlorobenzyl)(4-fluorophenyl)phosphinate;
1-methyl-3-butynyl bis[(2-pyridyl)methyl]phosphinate;
1-ethyl-2-propynyl phenyl(2-pyridyl)phosphinate;
1-ethyl-3-butynyl (benzyl)(thienyl)phosphinothionate;
2-methyl-3-butynyl bis(2,4-dichlorophenyl)phosphinate;
3-butynyl (2,4-difluorophenyl)(2-pyridyl)phosphinate;
2-propynyl bis(2-chlorobenzyl)phosphinothionate;
1-ethyl-2-propynyl (4-chlorobenzyl)(1-phenylethyl)-phosphinate;

and the like.

The novel synergists of this invention may be prepared by adaptation of the synthetic procedures illustrated above, i.e. from suitable phosphinic chlorides or phosphine oxides as well as by known procedures. Procedures for preparing phosphinates are well described in chemical literature, for example in K. Sasse, "Methoden der Organischen Chemie," vol. XII, part I, 4th edition, Stuttgart, 1963, pp. 247–266.

The novel synergists described herein have a degree of effectiveness not shared by closely related compounds. The nature and location of the unsaturated linkage has been found to have a marked effect on the synergistic effectiveness of this class of compounds. For example, reduction of the acetylenic linkage to an olefinic or a saturated linkage diminishes the synergistic activity. Displacement of the acetylenic linkage from the terminal position also decreases the activity.

The synergistic compositions of this invention may be employed to control a variety of crop pests and houshold pests. They are not usually applied full strength, but are generally incorporated with the adjuvants and carriers normally employed for facilitating dispersion of active ingredients for insecticidal applications, recognizing the accepted fact that the formulation and mode of application may affect the activity of a material. Striking results are obtained when these compositions are applied as space sprays and aerosol sprays, for example, or are formulated into any of the diluted and extended types of formulations used in insecticidal practice, including dusts, wettable powders, emulsifiable concentrates, solutions, granulars, baits, and the like, for application to foliage, within enclosed areas, to surfaces, and wherever insect control is desired.

These synergistic compositions may be made into liquid concentrates by solution or emulsification in suitable liquids, and into solid concentrates by admixing the active components with talc, clays, and other solid carriers used in the insecticide art. Such concentrates normally contain about 5–80% of the toxic composition, and the rest inert material which includes dispersing agents, emulsifying agents, and wetting agents. For practical application, the concentrates are normally diluted with water or other liquid for liquid sprays, with liquefied propellants for aerosols, or with additional solid carrier for application as a dust or granular formulation. Baits are usually prepared by mixing such concentrates with a suitable insect food, such as mixtures of cornmeal and sugar, and insect attractants may also be present. The concentration of the active ingredients in the diluted formulations, as generally applied for control of insects, is normally in the range of about 0.001% to about 5%. Many variations of spraying and dusting compositions are well known in the art, as are the techniques for formulating and applying these compositions.

Employing the synergistic pesticidal compositions described herein, enhanced control is obtained of both crop and household pests, including insects and acarids against which the cyclopropanecarboxylates are themselves effective, but at higher concentrations. This includes flying and crawling pests of the orders Coleoptera (beetles), Hemiptera (true bugs), Homoptera (aphids), Diptera (flies), Orthoptera (roaches), Acarina (mites and ticks), Lepidoptera (butterflies and moths including their larvae). Because of the low mammalian toxicity of these compositions, they are preferred compositions for use in control of pests in an environment inhabited by man and animals, including control of flies, mosquitoes, ants, roaches, moths, ticks, and the like, as well as in uses such as packaging, food and grain protection, and garden, pet, and livestock uses.

The relative amounts of synergist and chrysanthemumate employed are not critical, in that a relatively minor amount, e.g., less than one part of synergist per part of chrysanthemumate, is effective in imparting a beneficial effect to the combination. From practical considerations, it is preferred to use larger amounts of synergist, for example, from two to fifty parts of synergist per part of cyclopropanecarboxylate. Even larger proportions of synergist may be employed without detriment, whether or not the optimum synergistic proportions have been achieved. It is clear that effective amounts of synergist should be employed in the compositions, that the components should be present in synergistic proportions, and that effective amounts of the compositions, to control the particular insect pests in the environment of infestation, should be applied.

It is apparent that many modifications may be made in the formulation and application of the compositions of this invention, without departing from the spirit and scope of the invention.

We claim:

1. A compound of the formula

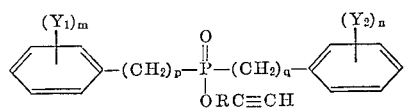

wherein R is an alkylene of one to six carbon atoms; X is selected from the group consisting of oxygen and sulfur; $Y_1$ and $Y_2$ are each selected from the group consisting of halogen and cyano; $Z_1$ and $Z_2$ are each selected from the group consisting of hydrogen, chlorine, and methyl; $m$ and $n$ are each an integer of 0 to 2 inclusive; and $p$ and $q$ are each an integer of 0 to 1 inclusive.

2. A compound of the formula

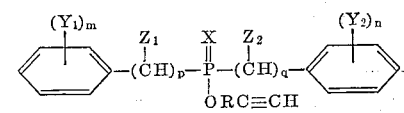

wherein R is an alkylene of one to four carbon atoms; $Y_1$ and $Y_2$ are each selected from the group consisting of chlorine and cyano; $m$ and $n$ are each an integer of 0 to 2; and $p$ and $q$ are each an integer of 0 to 1.

3. The compound of claim 2 having the name 2-propynyl diphenylphosphinate.

4. The compound of claim 2 having the name 1-methyl-2-propynyl diphenylphosphinate.

5. The compound of claim 2 having the name 3-butynyl diphenylphosphinate.

6. The compound of claim 2 having the name 2-propynyl (benzyl)phenylphosphinate.

7. The compound of claim 2 having the name 3-butynyl (benzyl)phenylphosphinate.

8. The compound of claim 2 having the name 2-propynyl (2-chlorobenzyl)phenylphosphinate.

9. The compound of claim 2 having the name 3-butynyl (2-chlorobenzyl)phenylphosphinate.

10. The compound of claim 2 having the name 2-propynyl (4-chlorobenzyl)phenylphosphinate.

11. The compound of claim 2 having the name 3-butynyl (4-chlorobenzyl)phenylphosphinate.

References Cited

UNITED STATES PATENTS 3,268,629  8/1966  Cherbuliez et al. ___ 260—956X

CHARLES B. PARKER, Primary Examiner

A. H. SUTTO, Assistant Examiner

U.S. Cl. X.R.

260—290, 294.8, 294.9, 302, 326.61, 329, 332.5, 346.1, 346.2, 347.2, 940, 973; 424—200, 202, 203, 219, 306